United States Patent
Wilson et al.

(10) Patent No.: US 10,919,633 B1
(45) Date of Patent: Feb. 16, 2021

(54) SEAT ASSEMBLY WITH VENTILATION SYSTEM UTILIZING VENTURI EFFECT TO MULTIPLY AIR FLOW

(71) Applicant: B/E Aerospace, Inc., Winston-Salem, NC (US)

(72) Inventors: Christopher Wilson, Clemmons, NC (US); Peter A. Stahl, Winston-Salem, NC (US); Catalin Bunea, Miramar, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 14 days.

(21) Appl. No.: 16/534,309

(22) Filed: Aug. 7, 2019

(51) Int. Cl.
*B64D 11/06* (2006.01)
*A47C 7/74* (2006.01)
*B60N 2/56* (2006.01)

(52) U.S. Cl.
CPC .......... *B64D 11/0626* (2014.12); *A47C 7/744* (2013.01); *B60N 2/5628* (2013.01); *B60N 2/5635* (2013.01); *B60N 2/5642* (2013.01)

(58) Field of Classification Search
CPC ............. B64D 11/0626; B60N 2/5628; B60N 2/5635; B60N 2/5642; A47C 7/744
USPC .......................... 297/180.12, 180.13, 452.47
See application file for complete search history.

(56) References Cited

U.S. PATENT DOCUMENTS

| | | |
|---|---|---|
| 4,031,579 A | 6/1977 | Larned |
| 6,869,140 B2 | 3/2005 | White et al. |
| 8,672,411 B2 | 3/2014 | Gomes et al. |
| 2004/0160092 A1 | 8/2004 | Laib |
| 2013/0084790 A1* | 4/2013 | Furuse ...................... B60H 1/32 454/75 |
| 2016/0144755 A1* | 5/2016 | Chen .................... B60N 2/5628 297/180.1 |

FOREIGN PATENT DOCUMENTS

DE 102007055034 A1 * 5/2009 ........... B60N 2/5642

* cited by examiner

*Primary Examiner* — Anthony D Barfield
(74) *Attorney, Agent, or Firm* — Suiter Swantz pc llo

(57) ABSTRACT

A ventilated seat assembly such as an aircraft passenger seat including a cushion assembly supported by a structural element, a plurality of Venturi tubes positioned to direct a flow of air through the cushion assembly, an air compressor supplying compressed air, a manifold assembly coupled in fluid communication with the air compressor, a conduit network fluidly coupling the manifold assembly with the plurality of Venturi tubes, and a controller for activating the air compressor and actuating the manifold assembly. Supplying a small volume of pressurized air to the Venturi tubes induces a larger flow of ambient air and a multiplied air effect to ventilate the passenger seat.

20 Claims, 6 Drawing Sheets

SEAT ASSEMBLY WITH VENTILATION SYSTEM UTILIZING VENTURI EFFECT TO MULTIPLY AIR FLOW

BACKGROUND

Aircraft seats and other vehicle seats can become uncomfortable over time, particularly when a passenger remains in a constant sitting position. To alleviate discomfort, seat manufacturers provide adjustability in the seat. In aircraft, seats may adjust from upright during taxi, takeoff and landing to reclined in-flight to achieve a more comfortable sitting position. While premium seating classes are configured to maximize comfort and seat adjustability, the space and cost constraints of economy classes limit seat constructions to a fixed seat bottom with limited backrest recline. Because the sitting position is essentially the same in an economy class seat whether the seat is upright or reclined, pressure points and hot spots tend to form quickly and remain the same throughout the duration of the flight.

Another way to alleviate seat discomfort is to heat or cool the seat. Heating typically involves embedding an element in the seat that is electrically activated to raise the surface temperature of the seat. Cooling systems typically require an air duct through which conditioned air flows to the seat occupant. While heating requires an electrical connection, cooling requires a conduit connection to the vehicle air conditioning system. The greater the number of seats to be cooled, the greater the number of connections needed and consequential drain on the vehicle air conditioning system. In aircraft, because of the large number of seats, limited capacity of the vehicle air conditioning system, and constraints that do not allow for a separate air conditioning system dedicated for seat cooling, typically only a limited number of premium class seats enjoy the benefit of cooling, if any.

Accordingly, what is needed is an inventive way to improve passenger seat comfort, and more particularly, a way to ventilate all types of seats regardless of seat construction, number of seats, and capacity of the vehicle air conditioning system.

SUMMARY OF THE INVENTIVE ASPECTS

To achieve the foregoing and other aspects, embodiments of the inventive concepts disclosed herein are directed to a ventilated seat assembly including a cushion assembly, a structural element supporting the cushion assembly, a plurality of Venturi tubes positioned relative to the cushion assembly to direct a flow of air through the cushion assembly, each Venturi tube comprising in fluid communication a compressed air inlet, an ambient air inlet, and a mixed air outlet, an air compressor supplying compressed air, a manifold assembly coupled in fluid communication with the air compressor, a conduit network fluidly coupling the manifold assembly with the plurality of Venturi tubes, and a controller operable for activating the air compressor to supply compressed air and actuating the manifold assembly to cause compressed air to flow through the conduit network to one or more of the plurality of Venturi tubes.

In some embodiments, the plurality of Venturi tubes includes a first grouping of Venturi tubes positioned to deliver a flow of air through a first target region of the cushion assembly and a second grouping of Venturi tubes positioned to deliver a flow of air through a second target region of the cushion assembly, wherein the controller is operable for actuating the manifold assembly to cause compressed air to flow to one or more of the first grouping of Venturi tubes and the second grouping of Venturi tubes.

In some embodiments, the cushion assembly is positioned in a backrest, and wherein the first target region corresponds to one of a lower backrest region, an upper backrest region, a lumbar region, a side bolster region, and a headrest region, and wherein the second target region corresponds to another one of the upper backrest region, the lumbar region, the side bolster region, and the headrest region.

In some embodiments, the cushion assembly is positioned in a backrest and comprises spacer mesh positioned in a target region through which the mixed air outlet of each of the plurality of Venturi tubes is directed to flow air through.

In some embodiments, the structural element is a backrest element positioned behind the cushion assembly in spaced apart relation thereto such that an air column is formed between the cushion assembly and the structural element, the air column in fluid communication with ambient air above or below the air column outside of the seat assembly, and wherein the ambient air inlet of each of the plurality of Venturi tubes is positioned to draw air from the air column.

In some embodiments, the cushion assembly includes at least one target region having spacer mesh positioned in the at least one target region and foam positioned outside of the at least one target region, and wherein the mixed air outlet of each of the plurality of Venturi tunes is positioned to direct a flow of air out through a front face of the cushion assembly through the at least one target region.

In some embodiments, the plurality of Venturi tubes are positioned near a back or bottom of the cushion assembly such that the mixed air outlet of each of the plurality of Venturi tubes is positioned and directed to flow air out through a front or top of the cushion assembly.

In some embodiments, the cushion assembly is positioned in a backrest or a seat bottom and is covered with a perforated dress cover.

In some embodiments; the cushion assembly is positioned in a seat bottom and the frame element is a seat pan, and wherein the cushion assembly includes a spacer mesh component positioned in at least one target region of the cushion assembly and a foam component positioned outside of the at least one target region, and wherein the plurality of Venturi tubes are positioned relative to the cushion assembly to direct a flow of air through the spacer mesh component.

In some embodiments, the cushion assembly includes at least one target region having spacer mesh positioned in the at least one target region and foam positioned outside of the at least one target region, and wherein the mixed air outlet of each of the plurality of Venturi tunes is positioned to direct a flow of aft in through a front face of the cushion assembly through the at least one target region.

In some embodiments, the controller is operatively coupled to or an integral part of a passenger seat control interface for at least one of activating the air compressor and actuating the manifold assembly.

In another aspect, the inventive concepts disclosed herein are directed to an aircraft passenger seat assembly including a backrest cushion assembly supported by a structural element, a seat bottom cushion assembly supported by a seat pan, a first plurality of Venturi tubes positioned relative to the backrest cushion assembly to direct a flow of air through the backrest cushion assembly, each Venturi tube comprising in fluid communication a compressed air inlet, an ambient air inlet, and a mixed air outlet, a second plurality of Venturi tubes positioned relative to the seat bottom cushion assembly to direct a flow of air through the seat bottom cushion assembly, each Venturi tube comprising in fluid communication a compressed air inlet, an ambient air inlet, and a mixed air outlet, an air compressor supplying compressed air, a manifold assembly coupled in fluid communication with the air compressor, a conduit network fluidly coupling the manifold assembly with the first plurality of Venturi tubes and the second plurality of Venturi tubes, and a controller operable for activating the air compressor to supply compressed air and actuating the manifold assembly to cause compressed air to flow through the conduit network to one or more of the first and second plurality of Venturi tubes.

In some embodiments, the first plurality of Venturi tubes includes a first grouping of Venturi tubes positioned to deliver a flow of air through a first target region of the backrest cushion assembly and a second grouping of Venturi tubes positioned to deliver a flow of air through a second target region of the backrest cushion assembly, wherein the controller is operable for actuating the manifold assembly to cause compressed air to flow to one or more of the first grouping of Venturi tubes and the second grouping of Venturi tubes.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
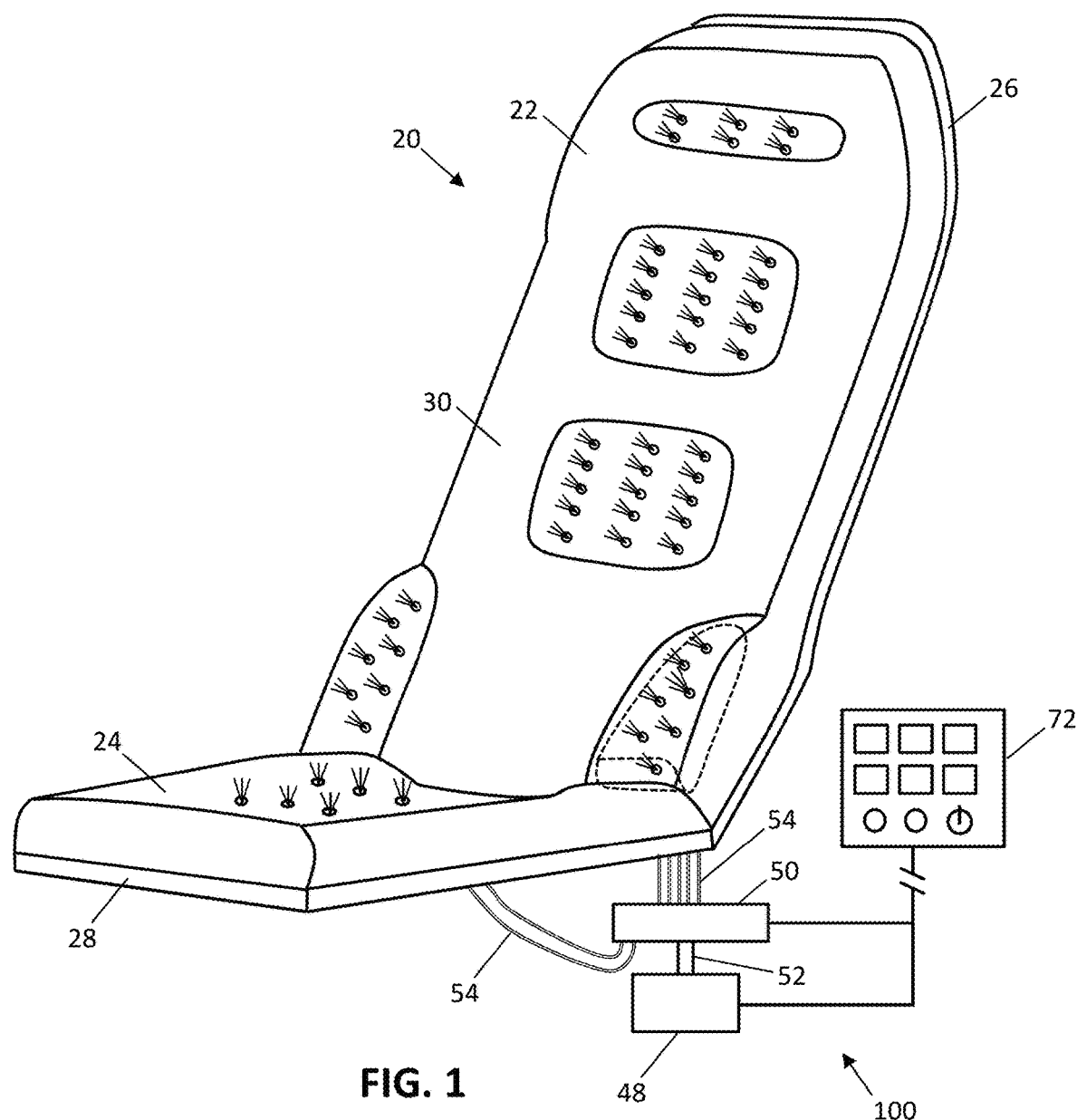
FIG. 1 is a front perspective view illustrating a seat assembly equipped with a ventilation system in accordance with an exemplary embodiment.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Referring to the drawing figures, the inventive concepts disclosed herein are directed to passenger seat constructions including seat ventilation systems for improving seat comfort. The seat constructions are not limited to any seat type and therefore find widespread application in all types of premium and economy class seat constructions, among crew seats and others. The ventilation systems disclosed herein can be integrated into the seat construction regardless of the adjustment and other capabilities of the seat. The ventilation systems according to the present disclosure can be incorporated into one or more of a backrest, seat bottom, headrest, armrest, and leg rest portions of a seat, as well as other furniture within the cabin environment.

The seat ventilation systems generally operate by supplying pressurized air to a device, or devices, in the seat construction configured to increase the efficiency of the compressed air system, thereby allowing the system to yield more flow across the passenger as compared to a compressed air system of the same power output that does not utilize a Venturi effect, or a ventilated seat system operating with fans (e.g., non-compressed air systems). Such a system is superior in that a high volumetric flow rate is achieved with a small input of volumetric flow rate, therefore increasing the efficiency as compared to an equivalent system of either purely compressed air ventilation or non-compressed. The ventilation systems disclosed herein can be used alone, with seat heating and cooling systems, or incorporated into other HVAC systems. The ventilation systems disclosed herein can achieve a significantly higher outlet pressure as compared to a fan, as well as avoid stalling out when the flow path is blocked by a seated passenger.

Figure 2:
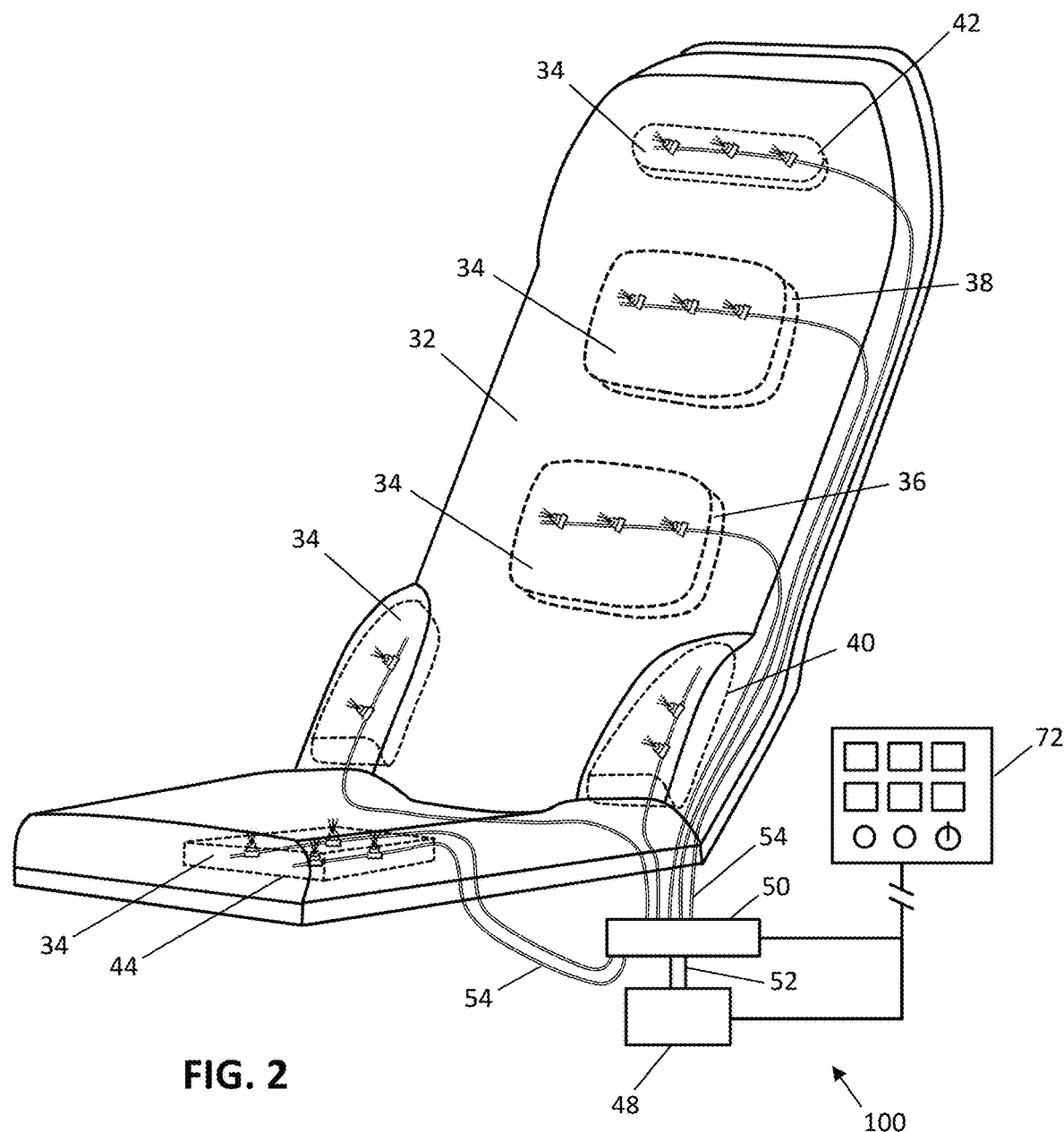
FIG. 2 is a front perspective view of the seat assembly illustrating predetermined ventilated target regions of the backrest and seat bottom.

Referring to FIGS. 1 and 2, a non-limiting example of a seat assembly is shown at reference numeral 20. The seat assembly 20 generally includes a backrest cushion assembly 22 and a seat bottom cushion assembly 24. A backrest structural element 26 supports the backrest cushion assembly 22. A seat pan 28 supports the seat bottom cushion assembly 24. Each of the backrest structural element 26 and the seat pan 28 may be constructed from rigid materials such as composites to support their respective flexible cushion assembly. Each of the backrest cushion assembly 22 and the seat bottom cushion assembly 26 can be covered with a dress cover 30 for comfort, performance and aesthetics. As discussed further below, portions of the dress cover corresponding to target regions on the seat cushion assemblies are perforated to allow air to flow therethrough to the passenger.

The construction and configuration of the backrest structural element 26 and the seat pan 28 may vary. For example, the two components may be continuous across the respective back and bottom of the seat or may be skeletal elements supporting a diaphragm. The two components may be pivotally coupled such that the backrest can recline relative to the seat bottom. The components may be pivotally coupled to each other or to other frame elements such as seat spreaders. The inclination of the backrest may be adjusted and locked relative to the seat bottom. In an economy class seat construction, for example, a gas compression spring may act between the backrest and the frame and a button may be positioned in the armrest actuated to unlock the gas spring through a lever and Bowden cable arrangement, among other arrangements. In a premium class seat construction, a control panel may be electrically coupled to one or seat actuators dedicated for driving component adjustability either alone or between discrete sitting positions. The ventilation systems disclosed herein operate mutually exclusive of a seat adjustment system.

Each of the backrest cushion assembly 22 and the seat bottom cushion assembly 24 may include more than one type of material in the cushion construction. In some embodiments, the cushion assemblies may include one or more layers of open-cell foam and closed-cell flotation foam with fire-resistant layers or additives, referred to herein collectively as the "foam" portion of the cushion assemblies shown generally at reference numeral 32. Cushion assemblies may additionally include spacer mesh 34 positioned in predetermined regions of the cushion assembly referred to herein as "target regions" or "target zones." Spacer mesh may be a three-dimensional mesh like body attached to or affixed within the foam to prevent the spacer mesh from being displaced with respect to the foam body. In some embodiments, the spacer mesh is positioned in ventilated areas of the cushion assembly or the target regions, and the foam is positioned outside of the ventilated areas or target regions. While both the foam and spacer mesh provide comfort and passenger support, the open-cell structure of the spacer mesh allows air flow therethrough. Some spacer mesh within the cushion assembly may be positioned near a front of the cushion assembly in a target region to direct air flow out through the perforated dress cover and across the passenger. Other spacer mesh may be positioned internal to the seat cushion assembly in an air column in which ambient air is drawn for addition with the pressurized air as described further below.

Target regions may be predetermined regions of the cushion assemblies corresponding to points of likely passenger contact. Regarding the backrest cushion assembly 22, target regions may be provided in one or more of a lower backrest or lumbar region 36, upper backrest region 38, side bolster regions 40, and headrest region 42. Regarding the seat bottom cushion assembly 24, a target region may correspond to a central region 44 of the seat bottom or other region. While the target regions generally correspond to regions of the cushion assembly most likely to be in passenger contact in the most likely sitting positions, the target regions may also be to one or more the lateral sides and longitudinal ends in embodiments functioning to move air through the cushion assembly in general. While the properties of the foam (e.g., polyurethane foam, soft synthetic resin foam, etc.) have better comfort performance as compared to the spacer mesh, the open-cell structure of the spacer mesh has better air flow performance as compared to the foam. Depending on the types of foam and spacer mesh, comfort differences between the two foam types may be imperceptible to the passenger, particularly when positioned beneath a seat dress cover 30. Each of the foam and the spacer mesh may be formed with contouring and concave portions to conform to passenger anatomy.

Portions of the spacer mesh adjacent the foam may be sealed to prevent air leakage. In some embodiments, the faces of the spacer mesh facing away from the passenger may also be sealed such that air contained in the spacer mesh is directed out through the unsealed face toward the passenger. In embodiments in which the spacer mesh is positioned in an air column in fluid communication with ambient air, the faces of the spacer mesh intended to draw ambient air therethough may be unsealed, while the faces in contact with the spacer foam or support element may be sealed to direct air flow through the spacer mesh without leaking.

Figure 3:
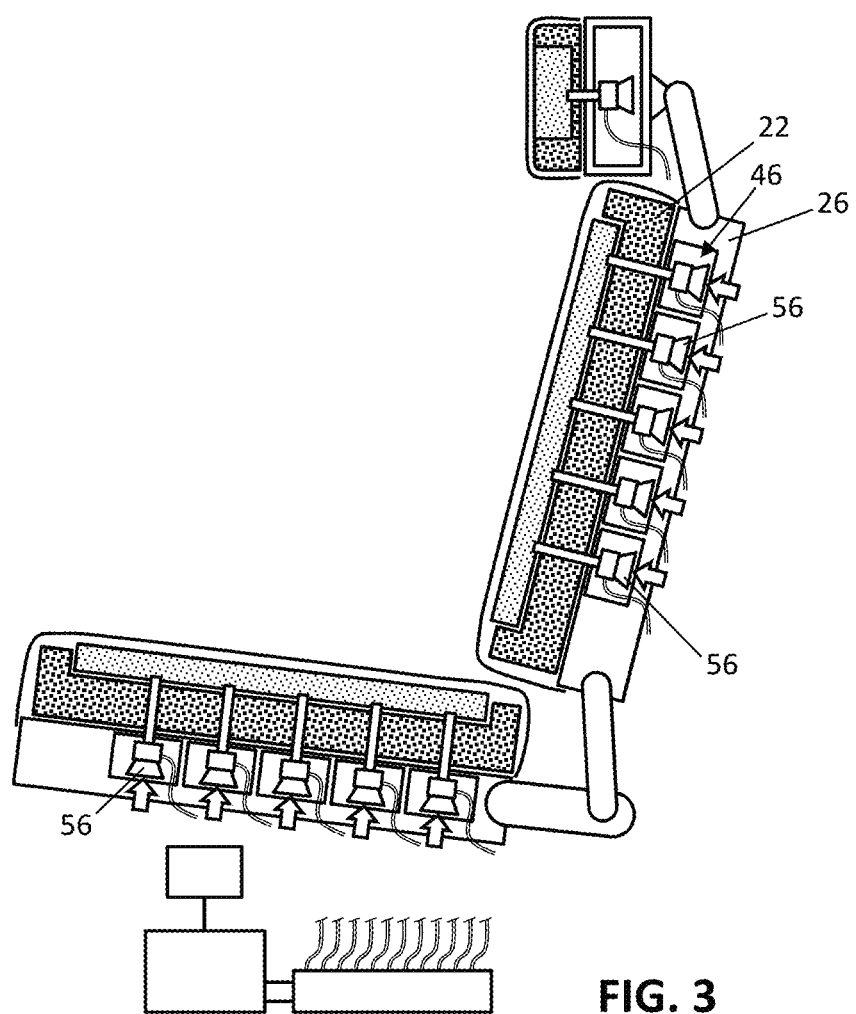
FIG. 3 is a cross-sectional view of the seat assembly illustrating ambient air being drawn in from outside of the seat assembly.

Referring to FIG. 3, the backrest cushion assembly 22 may be spaced apart from its respective backrest support element 26 such that an air column 46 is formed between a back of the cushion assembly and a front of the support element. The air column, which may be filled with spacer mesh, is in fluid communication with ambient air above or below the air column in the case of the backrest such that ambient air is drawn from outside the seat assembly in through the air column. Ambient air may be drawn from behind the backrest structural element from the area immediately behind the seat, depending on the position of the Venturi tubes 56. In the case of the seat bottom, ambient air may be drawn from an air column formed between the seat bottom cushion assembly and the seat pan or from below the seat pan, among other locations. Drawing ambient air from outside the seat assembly as opposed to drawing trapped air from within the seat assembly provides a lower ambient air temperature and therefore a cooler air flow temperature.

Referring again to FIG. 1, the seat construction 20 includes a ventilation system 100 incorporated into each of the backrest cushion assembly 22 and the seat bottom cushion assembly 24. It is intended and understood that the seat assembly may include a ventilation system for ventilating one or more of the backrest and seat bottom, with additional systems optionally incorporated into the leg rest and arm rests where applicable. The multiple systems may be coupled and supplied by a single air compressor 48 for supplying compressed air to a manifold assembly 50 coupled in fluid communication to the air compressor via an air conduit 52. As discussed in detail below, the manifold assembly 50 is actuated to supply a flow of compressed air to one or more of the conduit networks 54 in the seat assembly depending on the target region to be ventilated.

The air compressor 48 may be located with the seat assembly, such as below the seat pan 28 or backrest structural element 26. The manifold assembly 50 may be attached directly to the air compressor 48 or may be removed therefrom and coupled in fluid communication thereto with an air conduit 52, such as an air hose or the like, so that the manifold assembly and the air compressor can be located in two different locations with respect to the seat assembly because of packaging constraints. An electric motor of the air compressor 48 is activated to generate a supply of pressurized air. The air compressor 48 may operate at a fixed predetermined pressure such as a low inlet pressure yielding a flow large enough to cool the passenger, for example, less than 1 psi gauge pressure at the inlet of the Venturi devices, or in a range from 1-5 psi, or greater than 5 psi. The air compressor 48 may further include a pressure regulator and pressure gauges to control the amount of pressure provided to the manifold assembly 50. The air compressor may or may not include a small volume air storage tank providing a reservoir for storing air under pressure for immediate seat ventilation performance on demand. In a system including an air storage tank, the air compressor may regularly cycle on and off to replenish the supply of air in the tank when the tank reaches a predetermined low-pressure point. In a system without an air storage tank, the air compressor may activate with a control command to supply air and deactivate with a control command to discontinue supplying air.

The manifold assembly 50 may include a safety pressure release valve for releasing pressure from within manifold assembly. The manifold assembly 50 generally operates to control and distribute compressed air generated by the air compressor 48 to the conduit network(s) 54. The manifold assembly 50 generally includes an air inlet coupled in fluid communication with an air outlet of the air compressor via an air conduit 52, such as a length of air tubing, and one or more outlet ports corresponding in number to the number of air conduits of the conduit network. For example, the outlet ports may include 1, 2, 3, ... n number of outlet ports corresponding to 1, 2, 3, ... n number of air conduits of the conduit network. Extra outlet ports may be included to allow for future expansion of the system. Quick connect fittings, threaded connections and the like may be used to attach the air conduits to the manifold assembly 50. A pressure regulator assembly may be incorporated into the manifold assembly 50 and includes one or more valves opened or closed by actuating the controller to regulate the pressure of the compressed air at the one or more outlet ports to control air flow. For example, it may be desirable to provide the same or different air flow through the backrest and seat bottom. It may also be necessary to provide more air flow to a grouping of the conduit network having a greater number of Venturi tubes. The conduit networks are configured with regards to pressure drops across the networks such that their individual restriction yields equal flow to each Venturi tube. For example, in a network including two Venturi tubes supplied by the same air source, with one circuit having a longer length of tubing or a more bends than the other circuit, the system may be adjusted such that the two inlets receive the same air flow. Adjustment can be achieved, for example, utilizing flow control valves or a flow divider device (e.g., mechanical coupling of turbine shafts such that the volumetric flow rate through is equivalent). In another example, flow equivalence can be achieved by controlling pressure drops through the air conduits and fittings.

The conduit network 54 generally includes one or more length of air conduit, such as air tubing, each extending between an outlet port of the manifold assembly 50 and a compressed air inlet of one of the Venturi tubes. Each length of air conduit may be a direct run from one air outlet to one compressed air inlet. In some embodiments, a single outlet of the manifold assembly may supply a flow of compressed air to a single air conduit that in turn is split to supply compressed air to more than one downstream air conduit feeding a plurality of Venturi tubes. The air conduits may be routed through the respective cushion assembly, between the cushion assembly and its respective supporting element, of within passages defined along a face of the supporting element.

Each Venturi tube is coupled in fluid communication to a length of air conduit of the conduit network. For example, the Venturi tubes positioned in the backrest are coupled to a first conduit network in the backrest coupled in fluid communication with the manifold assembly, and the Venturi tubes positioned in the seat bottom are coupled to a second conduit network in the seat bottom coupled in fluid communication with the manifold assembly. Each venturi tube is positioned with respect to its cushion assembly to direct a flow of air out through a face of the cushion in one of the predetermined target regions. The Venturi tubes may be embedded in the cushion assembly, positioned between the cushion assembly, or coupled to the cushion supporting element, depending on the configuration of the Venturi tubes and where ambient air is intended to be drawn from. In an alternative embodiment, the Venturi tubes may be positioned within their respective cushion to pull air across the passenger by directing air flow back into the seat instead of out face of the cushion.

Figure 4:
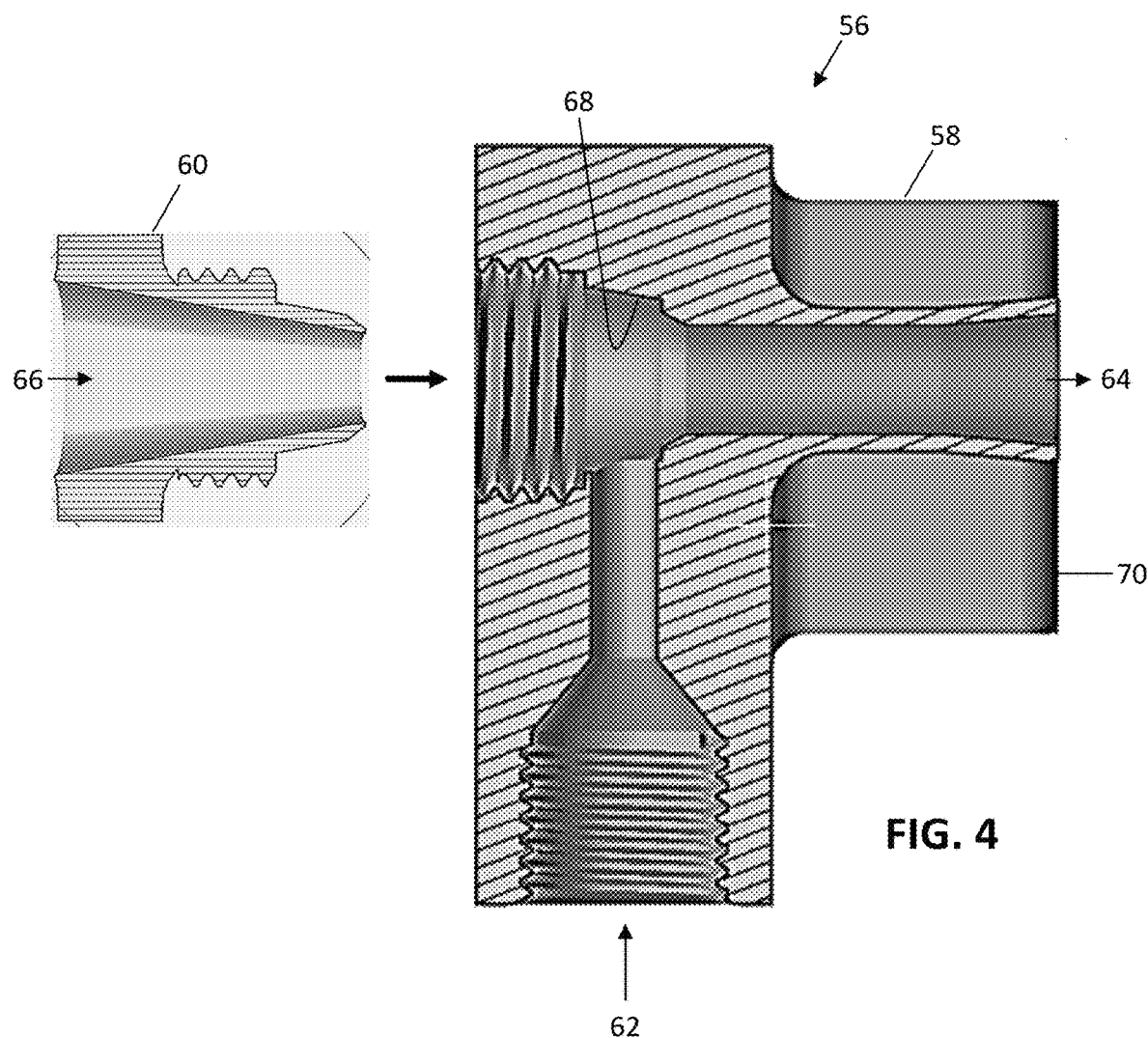
FIG. 4 is a cross-sectional view of a Venturi tube in accordance with an exemplary embodiment.
Figure 5:
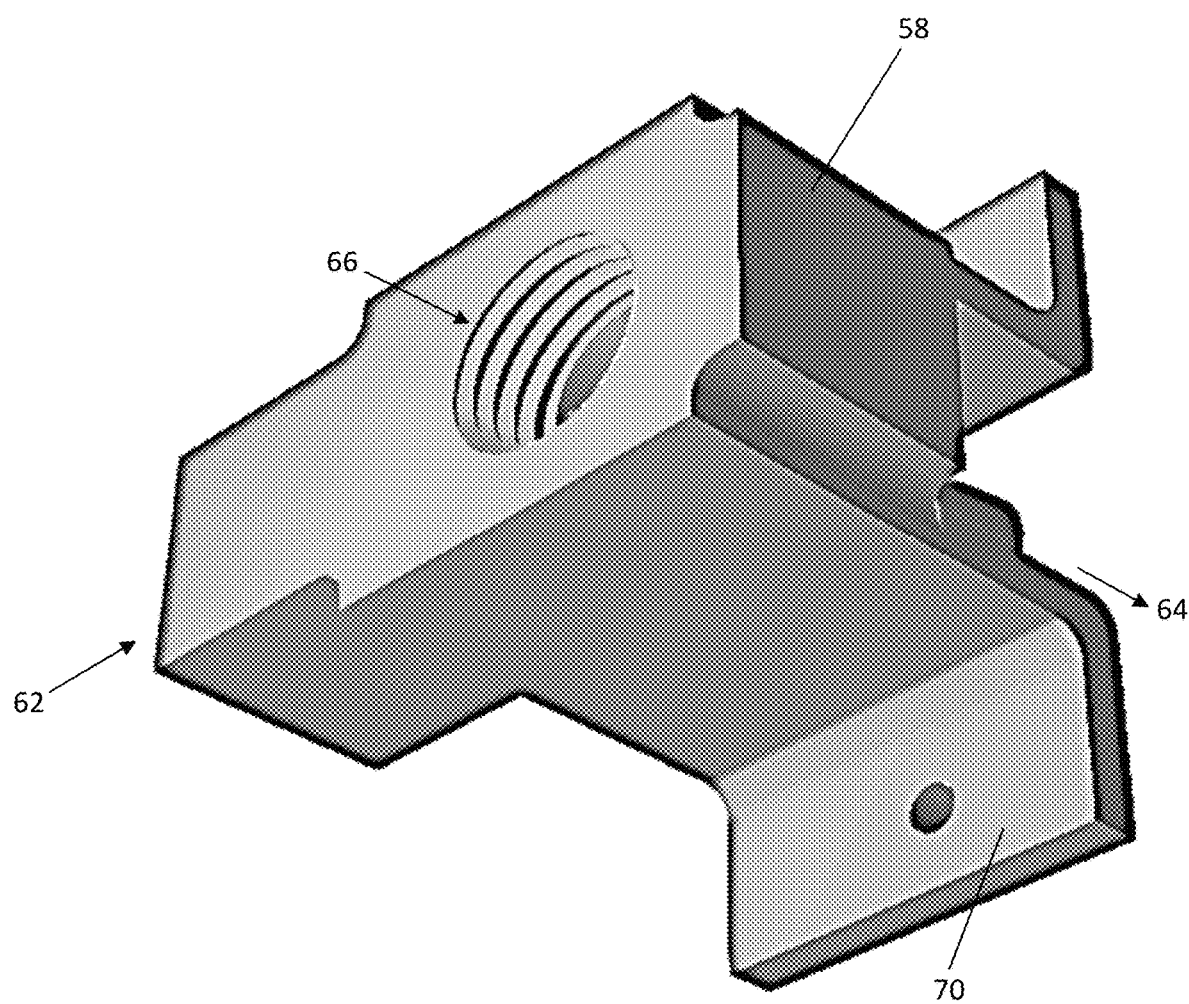
FIG. 5 is an isometric view of the main body of the Venturi tube of FIG. 4.
Figure 6:
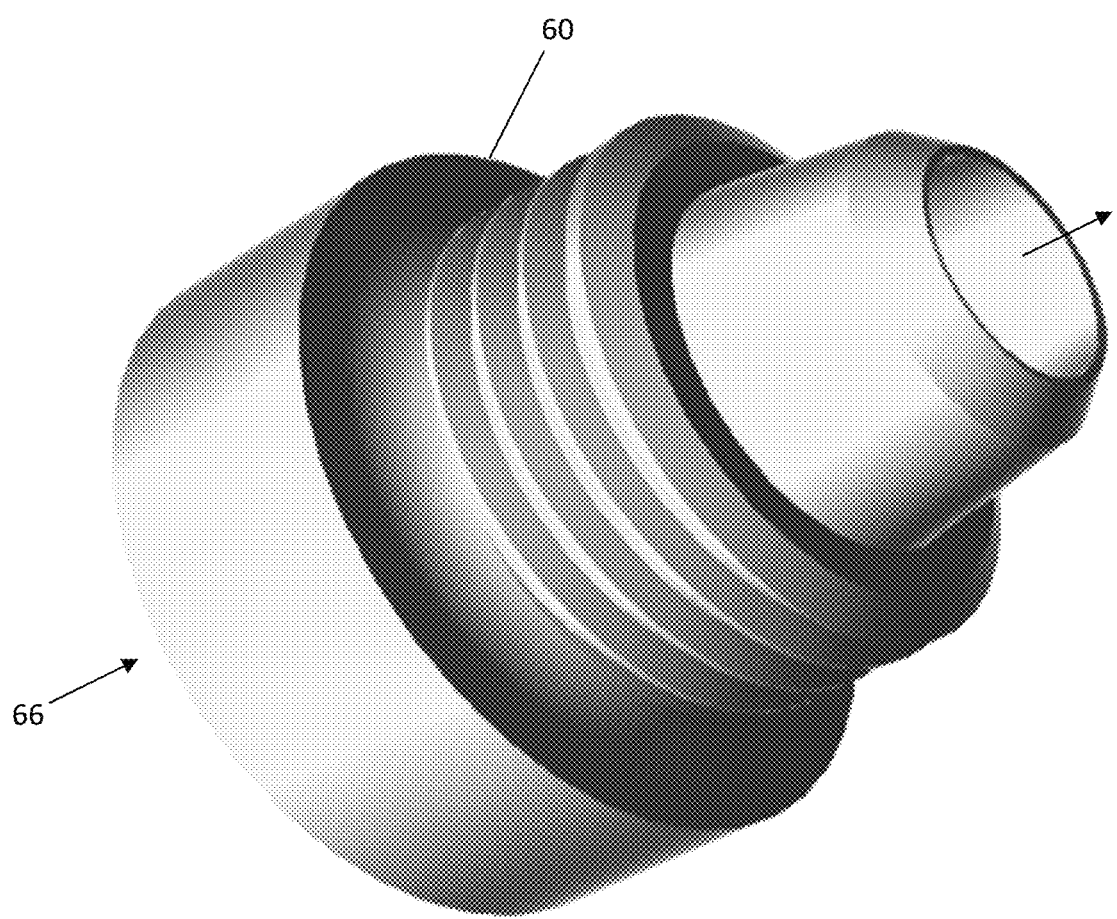
FIG. 6 is an isometric view of the secondary body of the Venturi tube of FIG. 4.

Referring to FIGS. 4-6, a non-limiting example of Venturi tube construction is shown at reference numeral 56. Each Venturi tube 56 generally operates to receive a small volume of pressurized air to induce a larger flow of ambient air. In other words, each Venturi tube generally operates to receive a small volumetric flowrate of pressurized air to induce a vacuum that causes ambient air to flow into the tube, thereby yielding a larger volumetric flowrate of combined airflow out of the tube. As compared to passive systems utilizing a large pump to move air, the present system utilizes a small pump to produce a higher pressure and higher volumetric flow rate.

The Venturi tube 56 construction includes a two-piece assembly including a main body 58 and a secondary body 60. The main body 58 forms the compressed air inlet 62 and the mixed air outlet 64 and is configured to couple the secondary body 60 forming the ambient air inlet 66. The compressed air inlet 62 is internally threaded to receive an externally threaded coupling of an air conduit in threaded engagement. The portion of the main body 58 receiving the secondary body 60 is also internally threaded to receive the externally threaded secondary body 60 in threaded engagement. The secondary body 60 has an axial air flow passage therethrough having an annular taper forming a cone in facing a direction of the mixed air outlet 64, such that when the secondary body 60 is threadably engaged in the main body 58 an annular space 68 is formed between the outside of the secondary body 60 and the inside of the main body 58. The installation of the secondary body 60 in the main body reduces the flow opening of compressed air through the main body 58, thereby creating a choke point and an annular curtain of compressed air flow to flow in a direction of the mixed air outlet 64, causing a suction effect. The suction effect causes ambient air to be drawn in through the ambient air inlet 66 and the two air flows (i.e., compressed air flow and ambient air flow) are added to cause a larger flow of air at ambient air pressure to flow out through the mixed air outlet 64.

Each mixed air outlet 64 is directed toward a predetermined target region of the cushion assembly, or elsewhere. For example, mixed air outlets may be positioned inward of the frontmost face of the backrest cushion assembly or the top face of the seat bottom cushion assembly to direct a flow of air through the front of the cushion and across a passenger. In another configuration, the mixed air outlets may be positioned to direct a flow of air through a spacer mesh at the front of the cushion assembly to circulate air through the cushion assembly and ultimately out the front of the cushion. The ambient air inlets are positioned to draw ambient air from within the seat assembly or outside of the seat assembly, and the main body 58 may include an integrated bracket 70 for securing the Venturi tube in place on a seat element.

In some embodiments, the plurality of Venturi tubes may be provided as a first grouping of Venturi tubes positioned to deliver a flow of air through a first target region of the cushion assembly and a second grouping of Venturi tubes positioned to deliver a flow of air through a second target region of the cushion assembly. When the cushion assembly is positioned in a backrest, the first target region may corresponds to one of a lower backrest region; an upper backrest region, a lumbar region, a side bolster region, and a headrest region, and wherein the second target region may correspond to another one of the upper backrest region, the lumbar region, the side bolster region, and the headrest region. The system can include and number of target regions and corresponding number of air conduits providing a flow of compressed air to the same. Each target region can include one or more Venturi tubes depending on the size of the target region and desired ventilation effect. In the backrest example, the structural element may be a continuous backrest element positioned behind the backrest cushion assembly in spaced apart relation thereto such that an air column is formed between the backrest cushion assembly and the structural element, the air column in fluid communication with ambient air above or below the air column outside of the seat assembly; and wherein the ambient air inlet of each of the plurality of Venturi tubes is positioned to draw air from the air column.

Referring again to FIG. 1, a controller 72 is operable for activating the air compressor to supply compressed air and actuating the manifold assembly to cause compressed air to flow through the conduit network(s). The controller may be operatively coupled to or an integral part of a passenger seat control interface. The control interface may be located on the seat assembly or in proximity thereto. The control interface may be collocated with the seat control features such that all seat comfort controls are provided in the same passenger device. Ventilation system controls may include; but are not limited to, one or more of activating the air compressor, adjusting compressor output, selecting a target regions(s) to be ventilated, etc. Each passenger control interface may be networked with a master crew controller capable of overriding each individual seat controller. For example, all ventilation systems may be deactivated during taxi, takeoff and landing and permitted to be selectively activated during flight.

The seat ventilation systems disclosed herein may further include at least one sensor positioned in the seat assembly coupled with the controller 72 and operable for activating the ventilation assembly in response to a sensed condition, such as a predetermined threshold temperature in one of the target regions to automatically and proactively avoid passenger discomfort. Each sensor may be a device or a subsystem capable of detecting condition changes within the seat assembly and with a processor within or in communication with the controller. The system sensors relay information to the processor where processing logic analyzes the data received to control the ventilation system. The processor may be a component of a server, such as a digital computer also including input/output (I/O) interfaces, a network interface, a data store, and memory. The components may be communicatively coupled via a local interface such as one or more buses or other wired or wireless connections. The local interface may have additional elements such as controllers, buffers (caches), drivers, repeaters, and receivers, among others, to enable communications. Further, the local interface may include address, control, and/or data connections to enable appropriate communications among the components.

The processor is a hardware device for executing software instructions such as collation algorithms. The processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the processor is configured to execute software stored within the memory, to communicate data to and from the memory, and to generally control operations of the server pursuant to the software instructions. The I/O interfaces may be used to receive user input from and/or for providing system output to one or more devices or components such as the described or inferred sensors, an aircraft network, and flight crew devices. I/O interfaces may include a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

A network interface may be used to enable the server to communicate on a network, such as the Internet, a wide area network (WAN), a local area network (LAN) such as the secure aircraft network, and the like, etc. The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described or inferred herein.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A ventilated seat assembly, comprising:
   a cushion assembly;
   a structural element supporting the cushion assembly;
   a plurality of Venturi tubes positioned relative to the cushion assembly to direct a flow of air through the cushion assembly, each Venturi tube comprising in fluid communication a compressed air inlet, an ambient air inlet, and a mixed air outlet;
   an air compressor supplying compressed air;
   a manifold assembly coupled in fluid communication with the air compressor;
   a conduit network fluidly coupling the manifold assembly with the plurality of Venturi tubes; and
   a controller operable for activating the air compressor to supply compressed air and actuating the manifold assembly to cause compressed air to flow through the conduit network to one or more of the plurality of Venturi tubes.

2. The seat assembly of claim 1, wherein the plurality of Venturi tubes comprises a first grouping of Venturi tubes positioned to deliver a flow of air through a first target region of the cushion assembly and a second grouping of Venturi tubes positioned to deliver a flow of air through a second target region of the cushion assembly, wherein the controller is operable for actuating the manifold assembly to cause compressed air to flow to one or more of the first grouping of Venturi tubes and the second grouping of Venturi tubes.

3. The seat assembly of claim 2, wherein the cushion assembly is positioned in a backrest, and wherein the first target region corresponds to one of a lower backrest region, an upper backrest region, a lumbar region, a side bolster region, and a headrest region, and wherein the second target region corresponds to another one of the upper backrest region, the lumbar region, the side bolster region, and the headrest region.

4. The seat assembly of claim 1, wherein the cushion assembly is positioned in a backrest and comprises spacer mesh positioned in a target region through which the Mixed air outlet of each of the plurality of Venturi tubes is directed to flow air through.

5. The seat assembly of claim 1, wherein the structural element is a backrest element positioned behind the cushion assembly in spaced apart relation thereto such that an air column is formed between the cushion assembly and the structural element, the air column in fluid communication with ambient air above or below the air column outside of the seat assembly, and wherein the ambient air inlet of each of the plurality of Venturi tubes is positioned to draw air from the air column.

6. The seat assembly of claim 1, wherein the cushion assembly comprises at least one target region having spacer mesh positioned in the at least one target region and foam positioned outside of the at least one target region, and wherein the mixed air outlet of each of the plurality of Venturi tunes is positioned to direct a flow of air out through a front face of the cushion assembly through the at least one target region.

7. The seat assembly of claim 1, wherein the plurality of Venturi tubes are positioned near a back or bottom of the cushion assembly such that the mixed air outlet of each of the plurality of Venturi tubes is positioned and directed to flow air out through a front or top of the cushion assembly.

8. The seat assembly of claim 1, wherein the cushion assembly is positioned in a backrest or a seat bottom and is covered with a perforated dress cover.

9. The seat assembly of claim 1, wherein the cushion assembly is positioned in a seat bottom and the frame element is a seat pan, and wherein the cushion assembly includes a spacer mesh component positioned in at least one target region of the cushion assembly and a foam component positioned outside of the at least one target region, and wherein the plurality of Venturi tubes are positioned relative to the cushion assembly to direct a flow of air through the spacer mesh component.

10. The seat assembly of claim 1, wherein the cushion assembly includes at least one target region having spacer mesh positioned in the at least one target region and foam positioned outside of the at least one target region, and wherein the mixed air outlet of each of the plurality of Venturi tunes is positioned to direct a flow of air in through a front face of the cushion assembly through the at least one target region.

11. The seat assembly of claim 1, wherein the controller is operatively coupled to or an integral part of a passenger seat control interface for at least one of activating the air compressor and actuating the manifold assembly.

12. An aircraft passenger seat assembly, comprising:
a backrest cushion assembly supported by a structural element;
a seat bottom cushion assembly supported by a seat pan;
a first plurality of Venturi tubes positioned relative to the backrest cushion assembly to direct a flow of air through the backrest cushion assembly, each Venturi tube comprising in fluid communication a compressed air inlet, an ambient air inlet, and a mixed air outlet;
a second plurality of Venturi tubes positioned relative to the seat bottom cushion assembly to direct a flow of air through the seat bottom cushion assembly, each Venturi tube comprising in fluid communication a compressed air inlet, an ambient air inlet, and a mixed air outlet;
an air compressor supplying compressed air;
a manifold assembly coupled in fluid communication with the air compressor;
a conduit network fluidly coupling the manifold assembly with the first plurality of Venturi tubes and the second plurality of Venturi tubes; and
a controller operable for activating the air compressor to supply compressed air and actuating the manifold assembly to cause compressed air to flow through the conduit network to one or more of the first and second plurality of Venturi tubes.

13. The seat assembly of claim 12, wherein the first plurality of Venturi tubes comprises a first grouping of Venturi tubes positioned to deliver a flow of air through a first target region of the backrest cushion assembly and a second grouping of Venturi tubes positioned to deliver a flow of air through a second target region of the backrest cushion assembly, wherein the controller is operable for actuating the manifold assembly to cause compressed air to flow to one or more of the first grouping of Venturi tubes and the second grouping of Venturi tubes.

14. The seat assembly of claim 13, wherein the first target region corresponds to one of a lower backrest region, an upper backrest region, a lumbar region, a side bolster region, and a headrest region, and wherein the second target region corresponds to another one of the upper backrest region, the lumbar region, the side bolster region, and the headrest region.

15. The seat assembly of claim 12, wherein each of the backrest cushion assembly and the seat bottom cushion assembly comprises spacer mesh positioned in a target region of the respective cushion assembly with the respective plurality of Venturi tubes, and foam positioned out of the target region of the respective cushion assembly.

16. The seat assembly of claim 12, wherein the structural element is positioned behind the backrest cushion assembly in spaced apart relation thereto such that an air column is formed between a back of the backrest cushion assembly and a front of the structural element, the air column in fluid communication with ambient air above or below the air column outside of the seat assembly, and wherein the ambient air inlet of each of the first plurality of Venturi tubes is positioned to draw air from the air column.

17. The seat assembly of claim 12, wherein the first plurality of Venturi tubes are directed to flow air in or out through a front of the backrest cushion assembly and the second plurality of Venturi tubes are directed to flow air in or out through a top of the seat bottom cushion assembly.

18. The seat assembly of claim 12, wherein each of the backrest cushion assembly and the seat bottom cushion assembly is covered with a perforated dress cover.

19. The seat assembly of claim 12, wherein the controller is operatively coupled to or an integral part of a passenger seat control interface for at least one of activating the air compressor and actuating the manifold assembly.

20. The seat assembly of claim 13, wherein the controller is operable for actuating the manifold assembly to supply air to at least one of the first grouping of Venturi tubes, second grouping of Venturi tubes, and second plurality of Venturi tubes.

* * * * *